(12) United States Patent
Yamazaki et al.

(10) Patent No.: US 7,923,146 B2
(45) Date of Patent: Apr. 12, 2011

(54) NICKEL BRIGHT-PLATED BATTERY

(75) Inventors: Tatsuya Yamazaki, Shizuoka (JP); Yuji Tsuchida, Shizuoka (JP)

(73) Assignee: FDK Energy Co., Ltd., Shizuoka (JP)

( * ) Notice: Subject to any disclaimer, the term of this patent is extended or adjusted under 35 U.S.C. 154(b) by 1020 days.

(21) Appl. No.: 11/796,049

(22) Filed: Apr. 26, 2007

(65) Prior Publication Data
US 2007/0243461 A1 Oct. 18, 2007

Related U.S. Application Data

(63) Continuation of application No. PCT/JP2005/015347, filed on Aug. 24, 2005.

(30) Foreign Application Priority Data

Oct. 29, 2004 (JP) ................................. 2004-316847

(51) Int. Cl.
*H01M 2/30* (2006.01)

(52) U.S. Cl. ...................................... 429/178; 429/206
(58) Field of Classification Search ........................ None
See application file for complete search history.

(56) References Cited

U.S. PATENT DOCUMENTS

2006/0124454 A1* 6/2006 Wurm et al. ............... 204/286.1

FOREIGN PATENT DOCUMENTS

| JP | 5-21044 A | 1/1993 |
| JP | 6-314563 A | 11/1994 |
| JP | 2001-279489 A | 10/2001 |
| JP | 2003-13279 | 1/2003 |
| JP | 2004-190064 A | 7/2004 |

* cited by examiner

*Primary Examiner* — John S Maples
(74) *Attorney, Agent, or Firm* — Harness, Dickey & Pierce, PLC

(57) ABSTRACT

A battery comprising electrode terminals 12a, 32a of a steel plate having a nickel bright-plating. The surface of the steel plate is dull finished and the concentration of sulfur and sulfur compound in the nickel bright-plating is at 0.02% or less by weight.

1 Claim, 5 Drawing Sheets

NICKEL BRIGHT-PLATED BATTERY

CROSS-REFERENCE TO RELATED APPLICATIONS

The present application claims priority from Japanese Patent Application No. 2004-316847 filed on Oct. 29, 2004 and PCT International Patent Application Ser. No. PCT/JP2005/015347 designating the U.S. filed on Aug. 24, 2005, which are herein incorporated by reference.

BACKGROUND ART

1. Technical Field

The present invention relates to a nickel bright-plated battery.

2. Related Art

In recent years, battery-powered apparatuses needing a large electric current such as digital still cameras have increased in number. Accordingly, high capacity dry batteries for a heavy load (discharging a large electric current) such as nickel-hydrogen batteries are beginning to be provided.

For example., the electromotive force of dry batteries such as LR is at a low voltage of about 1.5V. In order to draw a large current out of the low-voltage battery efficiently, electrical connection between the battery and a load (apparatus) needs to be kept good and stable over a long period of time. The battery is usually loaded into a battery holder (battery case) with spring contact terminals to be used. In this case, it is necessary to render the contact between the terminals of the battery and the terminals of the battery holder especially good and stable.

Hence, a nickel-plated steel plate is used as the terminal on the battery side. Furthermore, in order to make the appearance of batteries as products good, conventionally, steel plates having a bright (mirror) finish as their surface finish thereon are nickel bright-plated as shown in FIG. 5 and used.

FIG. 5 is a sectional view of a conventional battery and enlarged partial views of its terminals. The battery shown in the Figure has electricity generating elements including a solid cathode mixture 21, a separator 22 permeated by an electrolytic solution, and a gel-like anode mixture 23 put into a bottomed cylindrical battery can 11b, and the cathode can 11b is closed and sealed by an anode terminal plate 31b and a gasket 35.

The cathode can 11b works also as a cathode collector, and on the underside thereof, a convex cathode terminal 12b is formed. An anode terminal plate 31b has an anode collector 25 welded to its inner surface (on the battery inside), and its outer surface center forms an anode terminal 32b. The cylinder side, the other part than the terminals 11b, 32b, is covered by a cladding material 15.

The cathode can 11b has a steel plate 111b and a plating portion 112b as shown in its enlarged partial view of the Figure. The steel plate 111b has a bright finish on its surface. The plating portion 112b is formed by nickel bright-plating provided on the bright-finished surface. By this means, the surface of the cathode terminal 12b takes on smooth mirror brilliance. Likewise, the anode terminal plate 31b is also formed of a steel plate 311b having a bright-finished surface and a nickel bright-plating portion 312b as shown in its enlarged partial view of the Figure. By this means, the anode terminal 32b takes on smooth mirror brilliance.

Since the terminals 12b, 32b have smooth mirror brilliance on their surface, the above conventional battery is good in terms of appearance as a product (design effect). However, when the battery is loaded into the battery holder of a heavy load apparatus such as a digital still camera for use, the following problem occurs.

That is, if the surface of the battery terminal 12b (32b) is smooth mirror brilliance finished, contact with a contact terminal on the apparatus side (battery holder side) is over the entire terminal surface of the terminal 12b (32b). Hence, contact pressure on the apparatus side is dispersed to be small. In the case of low voltage, if contact pressure is not sufficient, contact failure is likely to occur. In order to prevent this from occurring, there is needed a countermeasure on the apparatus side that can produce sufficient contact pressure, but this requires providing, for example, especially strong spring pressure, and thus the load on the apparatus side is large.

Accordingly, the present inventors examined the use of steel plates having a dull (coarse surface) finish as their surface finish thereon. See, e.g., Japanese Patent Application Laid-Open Publication No. H06-314563. When the surfaces of dull finished steel plates are nickel bright-plated, fine bumps and dips (of the micron order) can be formed on the terminal surface with little damage to the appearance as a product (design effect). By this means, although the area of contact with the contact terminal on the apparatus side becomes smaller, contact pressure is concentrated locally, thus producing reliable electrical contact even with low voltage.

FIGS. 4A, 4B schematically show the electrical contact state of the terminals for their surface states in enlarged view. As shown in FIG. 4B, as to the terminal 12b (32b) having a surface of smooth mirror brilliance, the contact pressure acting between it and the contact terminal 50 on the apparatus side is dispersed, and thus it is hard to obtain reliable electrical contact. On the other hand, as shown in FIG. 4A, with the terminal 12b (32b) having fine bumps and dips on its surface, the contact pressure is concentrated on the bumps of the bumps and dips, and thereby reliable electrical contact can be obtained even with low voltage.

However, the inventors found that even with the nickel bright-plated terminal surface having fine bumps and dips formed thereon as shown in FIG. 4A, the contact degrades during a long period of time and that such degradation in contact occurs as becomes a problem especially when drawing a large current. In this case, as a means to improve the contact, there is a method where the terminals are plated with a conductive material such as gold that is excellent in conductivity and chemical stability, but the problem occurs that cost increases.

SUMMARY OF THE INVENTION

The present invention was made to solve the above problems, and an object thereof is to provide a low-voltage high-capacity battery that can stably keep good contact over a long period of time, with which a large current can be drawn out of the battery efficiently without the increase in cost, without imposing an especial load on the apparatus side and without badly damaging its appearance as a product.

Objects and configurations of the present invention other than the above will become clear from the description of the present specification and the accompanying drawings.

The present invention is a battery having electrode terminals which each comprise a steel plate that is nickel bright-plated. The finish of a surface of the steel plate is a dull finish and the concentration of sulfur and sulfur compound in the nickel bright-plating is at 0.02% or less by weight.

According to the present invention, there can be provided a low-voltage high-capacity battery that can stably keep good contact over a long period of time, with which a large current can be drawn out of the battery efficiently without the increase in cost, without imposing an especial load on the apparatus side and without badly damaging its appearance as a product.

Actions and effects other than the above will become clear from the description of the present specification and the accompanying drawings.

Figure 1:
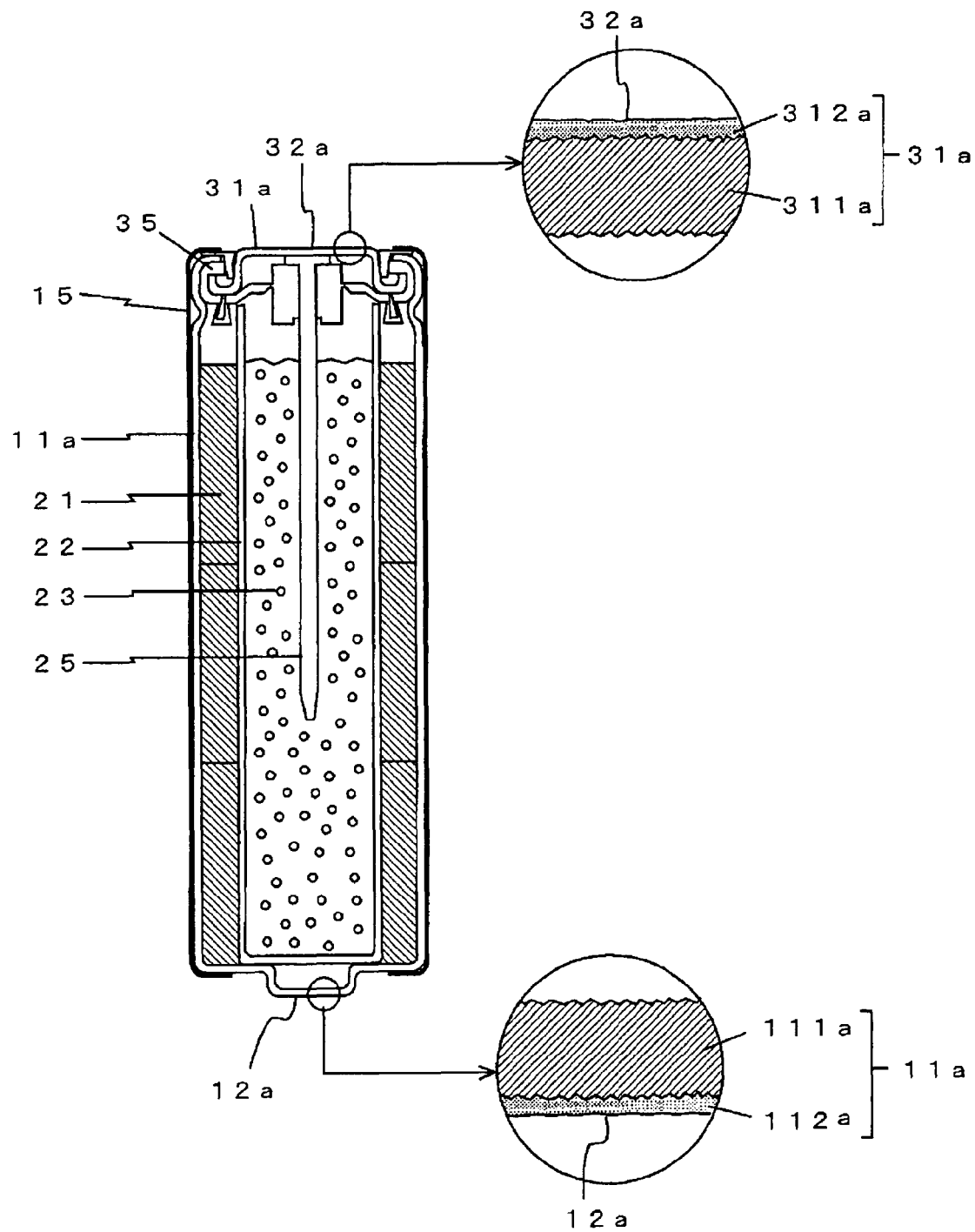
FIG. 1 is a sectional view of an embodiment of a battery that technology of the present invention has been applied to, and its enlarged partial views.

<Explanation of Reference Numerals>
11$a$ Battery can; 111$a$ Steel plate; 112$a$ Bright plating portion; 12$a$ Cathode terminal; 15 Cladding material; 21 Cathode mixture; 22 Separator; 23 Anode mixture; 25 Anode collector; 31$a$ Anode terminal plate; 311$a$ Steel plate; 312$a$ Bright plating portion; 32$a$ Anode terminal; 35 Gasket

BEST MODE FOR CARRYING OUT THE INVENTION

FIG. 1 shows one embodiment of a battery to which technology of the present invention has been applied. The battery of the Figure is an LR6 high-capacity alkaline dry battery, and has electricity generating elements including a solid cathode mixture 21, a separator 22 permeated by an electrolytic solution, and a gel-like anode mixture 23 put into a bottomed cylindrical battery can 11$a$, and the cathode can 11$a$ is closed and sealed by an anode terminal plate 31$a$ and a gasket 35.

The cathode can 11$a$ works also as a cathode collector, and on the underside thereof, a convex cathode terminal 12$a$ is formed. An anode terminal plate 31$a$ has an anode collector 25 welded to its inner surface (on the battery inside), and its outer surface center forms an anode terminal 32$a$. The cylinder side, the other part than the terminals 11$a$, 32$a$, is covered by a cladding material 15.

The cathode can 11$a$ has a steel plate 111$a$ and a plating portion 112$a$ as shown in its enlarged partial view of the Figure. The steel plate 111$a$ has a dull finish provided on its surface. A surface of the bright surface finish is smooth and like a mirror, but a surface of the dull surface finish is coarse with fine bumps and dips.

The plating portion 112$a$ is formed by nickel bright-plating provided on the dull-finished surface. The nickel bright-plating contains a given amount or more of sulfur. In the present invention, the plating portion 112$a$ is formed by plating that contains sulfur and sulfur compound in a concentration of 0.02% or less by weight. The cathode terminal 12$a$ is formed of the dull finished steel plate 111$a$ and the nickel bright plating portion 112$a$.

Likewise, the anode terminal 32$a$ of the anode terminal plate 31$a$ is also formed of a steel plate 311$a$ having a dull finished surface and a plating portion 312$a$ of nickel bright-plating containing sulfur and sulfur compound in a concentration of 0.02% or less by weight.

That is, since conventional, nickel bright-plated terminals contain sulfur and sulfur compound in a concentration of as much as 0.05% by weight, a chemical coat (e.g. an oxide film) is created on their surfaces during a long time of preservation, causing their contact resistance to increase. Further, the greater amount of sulfur in the plating results in larger contact resistance. That is, it was found that by reducing the concentration of sulfur in the nickel plating to a certain level, the increase in contact resistance due to the chemical coat can be suppressed effectively. Moreover, it was found that in order to prevent the increase in contact resistance due to the chemical coat for a long period of time without badly damaging the appearance (brilliance), the concentration of sulfur and sulfur compound in the nickel plating needs to be at 0.02% or less by weight.

In the battery of the embodiment, at least the surfaces of parts of steel plates forming the electrode terminals 12$a$, 32$a$ are dull finished, and the concentration of sulfur and sulfur compound in the nickel plating is at 0.02% or less by weight. Thereby, good and stable electrical contact can be kept over a long period of time.

Figure 4:
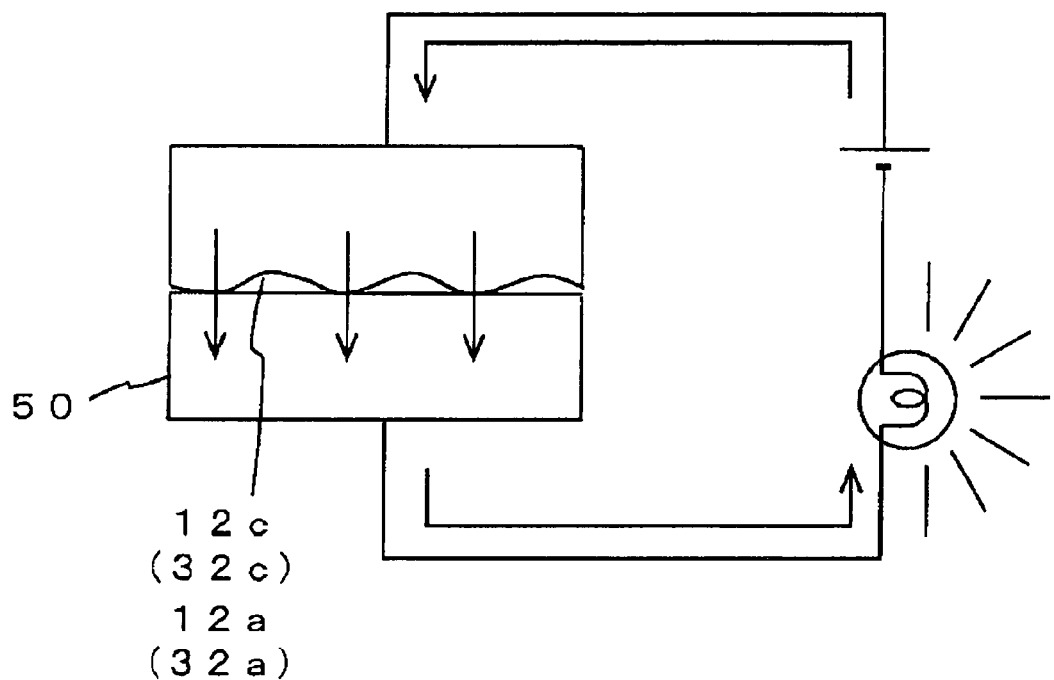
FIGS. 4A, 4B illustrate a model view showing the electrical contact state of the terminals for the states of their surfaces.
Figure 4:
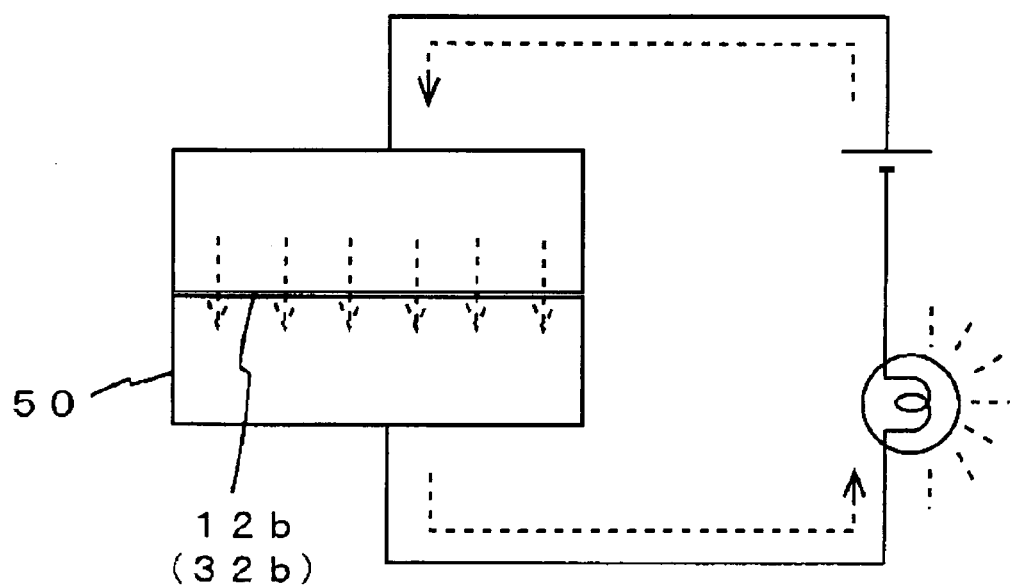
Figure 5:
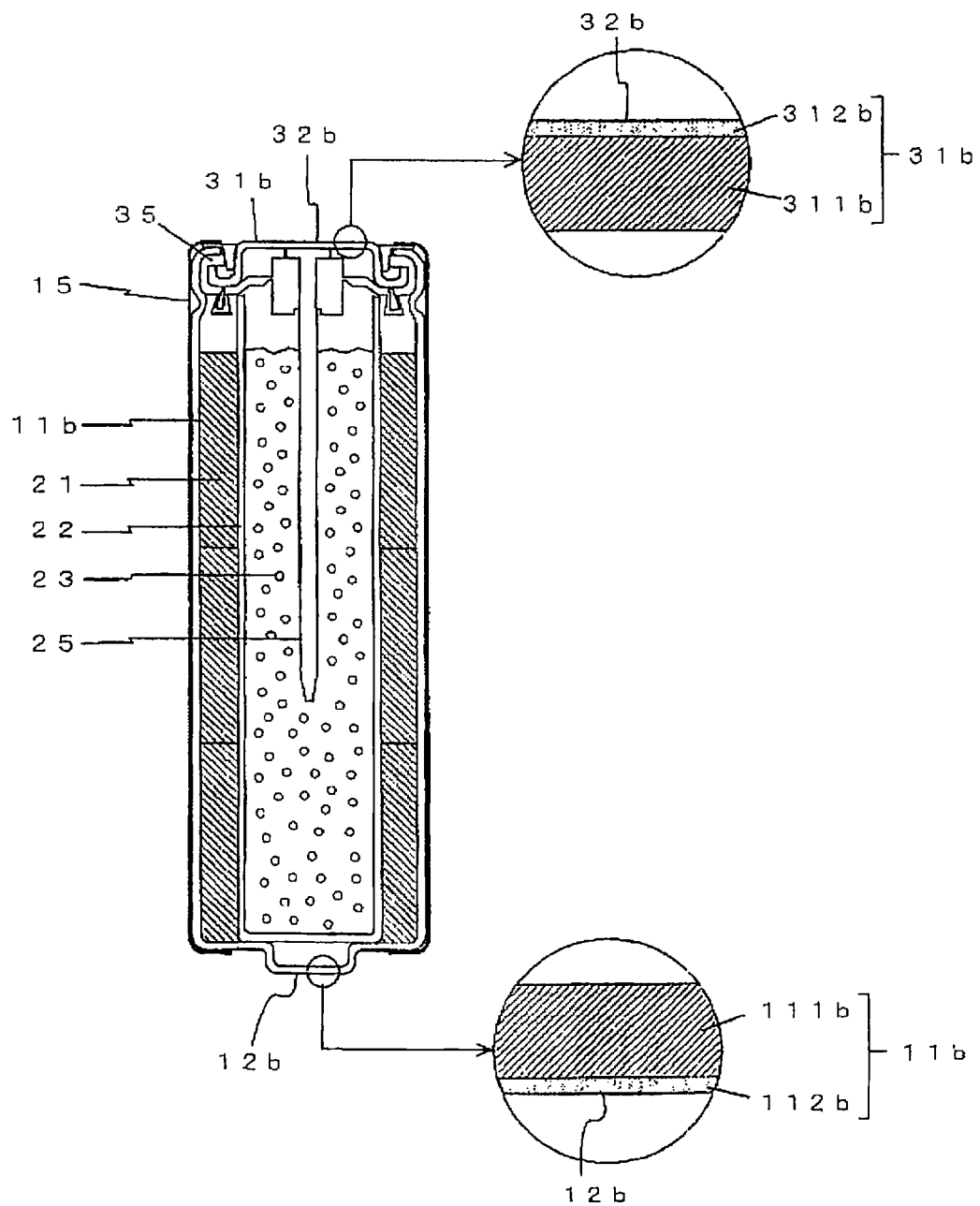
FIG. 5 is a sectional view of an example conventional battery and its enlarged partial views.

Furthermore, the terminals 12$a$, 32$a$ configured as above have fine bumps and dips on their surface, and as schematically shown in FIG. 4A, contact pressure is concentrated locally, and thereby reliable electrical contact can be achieved even with low voltage.

Yet further, as to the appearance of the terminals 12$a$, 32$a$, their surfaces are not like a smooth mirror as with conventional, nickel bright-plating, but are better than with non-bright plating, not badly damaging the appearance as a product. For example, as to the smooth mirror-like surface obtained by the conventional, nickel bright-plating, little distortion in the terminal surface may catch attention by mirror reflection. Meanwhile, with the nickel bright-plated surface of the present invention having sulfur and sulfur compound in a concentration of 0.02% or less by weight, such distortion will not catch attention.

Figure 2:
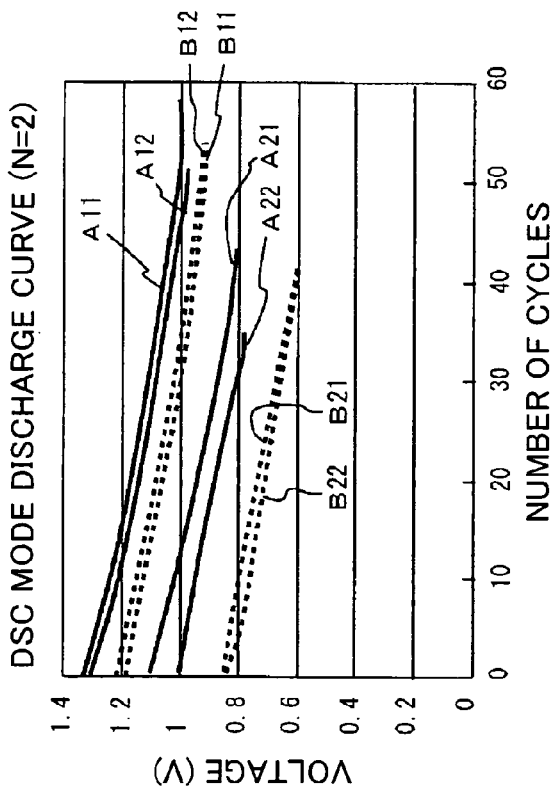
FIG. 2 is a graph showing test results of discharge voltage variations for a battery of the present invention and a conventional battery.

FIG. 2 shows test results of voltage variations due to discharge for a battery of the present invention and a conventional battery. The configuration of the batteries used as test samples and test conditions are as follows.

Battery of the present invention (A11 to A22): the cathode and anode terminals have the surfaces of their steel plates dull finished and are nickel bright-plated in a thickness of 2 μm and with sulfur and sulfur compound present in a concentration of 0.01% by weight.

Conventional battery (B11 to B22): the cathode and anode terminals have the surfaces of their steel plates bright finished and are nickel bright-plated in a thickness of 2 μm and with sulfur and sulfur compound present in a concentration of 0.05% by weight.

Test conditions: A sample battery (battery to be tested) is loaded into a spring battery holder, and the variations in its discharge voltage is observed while performing a discharge test according to a DSC mode (a discharge test with a cycle consisting of drawing a 2 A of current for 0.5 sec and drawing a 300 mA of current for 59.5 sec). The battery holder has contact terminals spring-biased to be pushed at a load of 10 to 11 N against the cathode and anode terminals of the sample battery. The discharge voltage of the sample battery is measured via the contact terminals of the battery holder.

The test under the above conditions was performed on each sample battery, twice each for the initial and after 20-day preservation in the environment of 60° C. and 90% (relative humidity). As a result, as shown in the Figure, it was found that in discharge performance both at the initial before the preservation and thereafter, a greatly higher discharge voltage can be obtained with the batteries of the present invention than with conventional batteries. The discharge voltage at the initial test reflects the initial state of electrical contact of the terminals, and the discharge voltage at the test after preservation reflects the over-time degraded state of the terminals. Both states of the batteries of the present invention are improved greatly.

Figure 3:
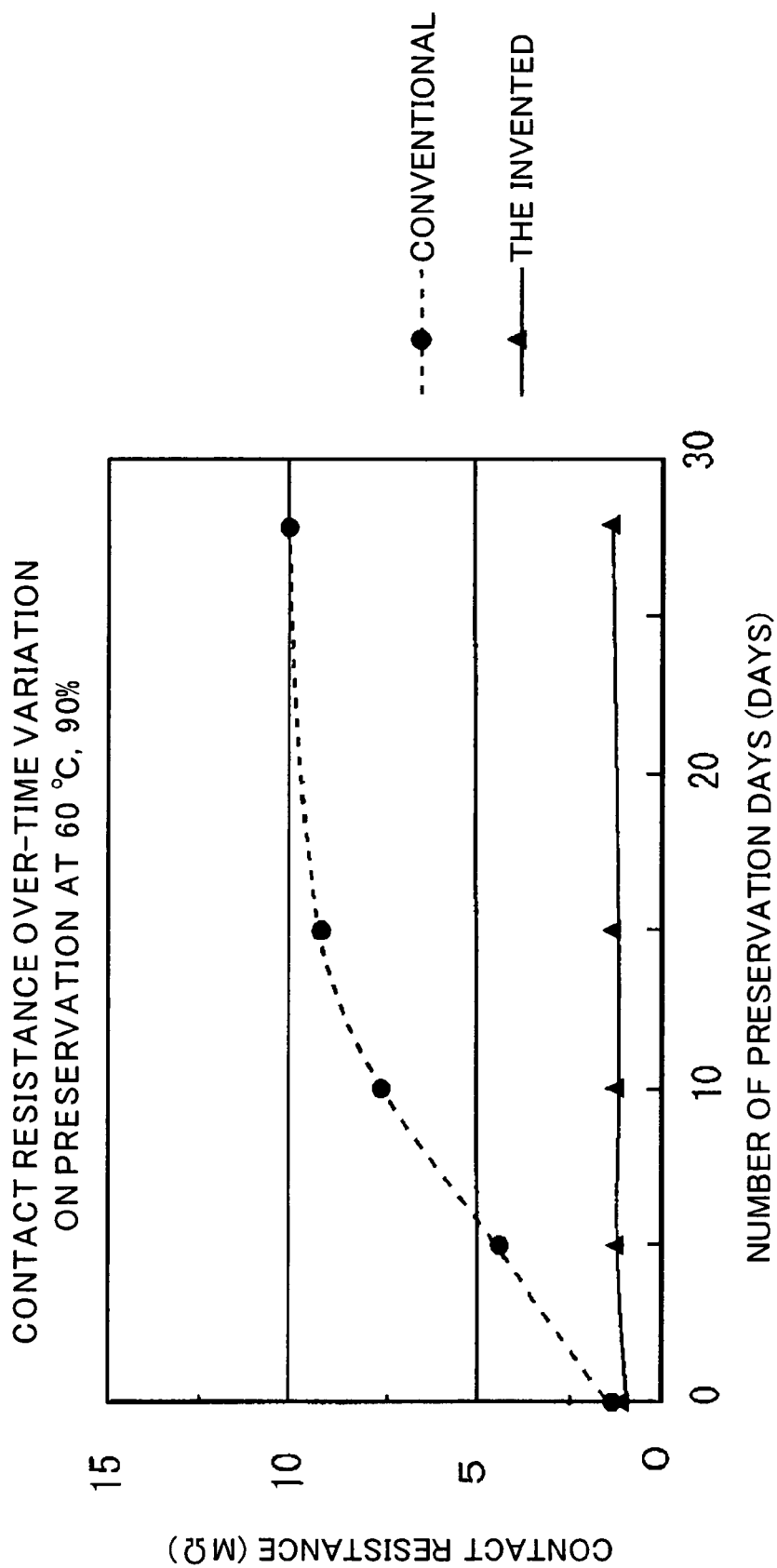
FIG. 3 is a graph showing test results of contact resistance over-time variation for a battery of the present invention and a conventional battery.

FIG. 3 shows test results of contact resistance over-time variation for a battery of the present invention and a conventional battery. The contact resistance was measured using a gold-made pole-like probe of 1.0 mm $\phi$. As shown in the Figure, while the contact resistance of the conventional battery increased with the number of preservation days, almost no increase in the contact resistance was seen for the battery of the present invention.

As to the appearance of the terminals, although the smooth mirror brilliance of conventional batteries as above may be a merit in terms of beauty, little distortion in the terminal surface may catch attention by mirror reflection, which is apparently a demerit in terms of beauty. On the other hand, batteries of the present invention do not have as much brilliance as conventional ones, but are better in appearance than with non-bright plating, at least not badly damaging the appearance as a product.

Although the technology of the present invention has been described by way of a typical battery embodiment, various other embodiments and applications of the present invention are possible.

There can be provided a low-voltage high-capacity battery that can stably keep good contact over a long period of time, with which a large current can be drawn out of the battery efficiently without the increase in cost, without imposing an especial load on the apparatus side and without badly damaging its appearance as a product.

There can be provided a terminal material for low voltage that can stably keep good electrical contact over a long period of time without the need of excessive external contact pressure.

Objects and configurations of the present invention other than the above are clear from the description of the present specification and the accompanying drawings.

What is claimed is:

1. A battery comprising:
    an electrode terminal of a steel plate having a nickel bright-plating, wherein a surface of the steel plate is dull-finished and the concentration of sulfur and the sulfur compound(s) in the nickel bright-plating are at 0.02% or less by weight.

* * * * *